United States Patent [19]

Bovo et al.

[11] Patent Number: 4,536,870
[45] Date of Patent: Aug. 20, 1985

[54] PCM SWITCHING NETWORK WITH SURPLUS CAPACITY

[75] Inventors: Amilcare Bovo; Luigi Canato, both of Milan, Italy

[73] Assignee: Italtel Societa Italiana Telecomunicazioni, Milan, Italy

[21] Appl. No.: 528,535

[22] Filed: Sep. 1, 1983

[30] Foreign Application Priority Data

Sep. 1, 1982 [IT] Italy ............................... 23078 A/82

[51] Int. Cl.³ .............................. H04J 1/16; H04J 3/14
[52] U.S. Cl. ......................................... 370/16; 370/63
[58] Field of Search ................... 370/16, 63, 64, 66

[56] References Cited

U.S. PATENT DOCUMENTS

| | | | |
|---|---|---|---|
| 3,886,318 | 5/1975 | Charransol | 370/16 |
| 3,919,485 | 11/1975 | Lohr et al. | 370/16 |
| 3,920,914 | 11/1975 | Regnier et al. | 370/16 |
| 3,991,276 | 11/1976 | Regnier et al. | 370/63 |
| 4,071,702 | 1/1978 | Charransol et al. | 370/63 |
| 4,074,077 | 2/1978 | Charransol et al. | 370/63 |
| 4,081,611 | 3/1978 | Bovo et al. | 370/63 |
| 4,160,127 | 7/1979 | Slana et al. | 370/16 |
| 4,228,535 | 10/1980 | Workman et al. | 370/16 |
| 4,254,498 | 3/1981 | Tawara et al. | 370/16 |
| 4,382,294 | 5/1983 | Beuscher et al. | 370/16 |
| 4,398,285 | 8/1983 | Lutz et al. | 370/16 |
| 4,412,322 | 10/1983 | Briley et al. | 370/63 |
| 4,413,335 | 11/1983 | Clements et al. | 370/16 |

FOREIGN PATENT DOCUMENTS 2427668 1/1975 Fed. Rep. of Germany .
2612249 10/1976 Fed. Rep. of Germany .
2607676 8/1980 Fed. Rep. of Germany .

*Primary Examiner*—Douglas W. Olms
*Assistant Examiner*—Kenneth I. Rokoff
*Attorney, Agent, or Firm*—Karl F. Ross; Herbert Dubno

[57] ABSTRACT

A network for selectively switching channels from n incoming PCM links to as many outgoing PCM links comprises two sections of a receiving-side stage with n input terminals each, connected in parallel to respective incoming links, and with m output terminals working into an intermediate stage with 2m input terminals and as many output terminals. The latter are connected to respective input terminals of two sections of a transmitting-side stage with n output terminals each; homologous output terminals of the two transmitting-side sections are alternatively connectable to respective channels of n outgoing PCM links by means of multiplexers which are switched by a logic unit under the control of a processor also detecting possible malfunctions in any section. Each stage consists of a multiplicity of temporal or spatial switching matrices. With m lying between n/2 and n, and with all matrices operating normally, the logic unit routes about half the incoming channels through each receiving-side section and each transmitting-side section; the matrices of the intermediate stage provide a plurality of alternate paths between any receiving-side matrix and any transmitting-side matrix. When a receiving-side or transmitting side matrix fails, the routes established therethrough are transferred to its counterpart in the other section of the respective stage; failure of an intermediate matrix results in a redistribution of its routes through the remaining matrices of this stage.

4 Claims, 2 Drawing Figures

PCM SWITCHING NETWORK WITH SURPLUS CAPACITY

FIELD OF THE INVENTION

Our present invention relates to a switching network for selectively interconnecting, in a communicaton system operating with pulse-code modulaton (PCM), channels from a multiplicity of incoming PCM links to respective channels of as many outgoing PCM links.

BACKGROUND OF THE INVENTION

A switching network of this type has been disclosed in commonly owned U.S. Pat. No. 4,081,611. According to the disclosure of that prior patent, two such networks operate in parallel under the control of an associated processor designating one of them as a master and the other as a slave. The slave network, acting as a standby, provides the redundancy necessary to maintain existing connections in the event of a malfunction affecting the master network. The processor is also subdivided into two sections operating in such a master/slave relationship.

The need for letting the slave network take over the role of the master is determined by test circuits or malfunction detectors which, in the system of that prior patent, are part of a coordinating unit connected between outputs of the two switching networks. Such malfunction detectors can also be part of a centralized control unit; see, for example, Castriotta et al U.S. Pat. No. 4,208,552 which discloses a preprocessor coacting with a microprocessor in monitoring the correct operation of associated equipment. The centralized control unit constitutes a higher-ranking component of a hierarchical structure.

The replacement of a centralized control unit with interacting lower-ranking units in a nonhierarchical structure is also known in the art. See, for example, a papaer by R. Galimberti et al titled "Proteo System: An Overview", delivered at the International Switching Symposium of September 1981 in Montreal, Canada.

OBJECT OF THE INVENTION

The object of our present invention is to provide a switching network for the purpose set forth which inherently disposes of the redundancy necessary to maintain connections in the event of a malfunction without the need for a standby and without excessive encumbrance.

SUMMARY OF THE INVENTION

A switching network embodying our invention, designed to interconnect channels from n incoming PCM links to channels of n outgoing PCM links, is basically divided into three cascaded stages, namely a receiving-side stage, an intermediate stage and a transmitting-side stage. The receiving-side stage is formed by a pair of mutually identical first sections each having a multiplicity of switching units with a total of n first input terminals and m first output terminals where m is a number not more than n nor less than n/2. Each incoming PCM link is connected in parallel to a respective pair of homologous input terminals of these first sections. The transmitting-side stage is similarly formed by a pair of mutually identical second sections each having a multiplicity of switching units with a total of m second input terminals and n second output terminals. The intermediate stage has a multiplicity of switching units with a total of 2m third input terminals connected to respective first output terminals and 2m third output terminals connected to respective second input terminals, the switching units of this stage establishing a plurality of alternative signal paths between any switching unit of the receiving-side stage and any switching unit of the transmitting-side stage. Each outgoing PCM link is connectable, with the aid of switchover means, to either one of a pair of homologous output terminals of the aforementioned second sections forming part of the transmitting-side stage. The several stages as well as the switchover means are controlled by logic means, in response to instructions from an associated processor, to route traffic from any incoming PCM link to any outgoing PCM link, via one of the switching units of the intermediate stage, through switching units of a single receiving-side section and a single transmitting-side section; upon detection of a malfunctioning switching unit affecting such traffic, the processor commands the logic means to reroute same from the malfunctioning unit to an available switching unit of the same stage for passage over an alternative path.

Each PCM link may be assumed, as in the description of the aforementioned prior U.S. Pat. No. 4,081,611, to carry a certain number of bytes (usually 32) in respective time slots of a recurrent frame, each channel having one such time slot assigned to it. The interconnection of an incoming and an outgoing channel may therefore involve both a spatial and a temporal switching. Each of the two switching networks of that prior patent also consists of three cascaded stages, the middle one being of the space-switching kind whereas the other two operate with time switching. In the present instance, the three stages could also operate in the time/space/time or in the inverted space/time/space mode; we prefer, however, to use temporal switching throughout.

In any event, each incoming or receiving-side section and each outgoing or transmitting-side section of our present network dialogues with only some of the associated links, to the exclusion of the other section of the same stage, so that the two sections of a stage never operate in parallel. This also applies to the individual switching units of the intermediate stage which, in the limiting case of m=n/2, have just enough input and output terminals to handle the traffic of all incoming links.

BRIEF DESCRIPTION OF THE DRAWING

The above and other features of our present invention will now be described in detail with reference to the accompanying drawing in which.

SPECIFIC DESCRIPTION

Figure 1:
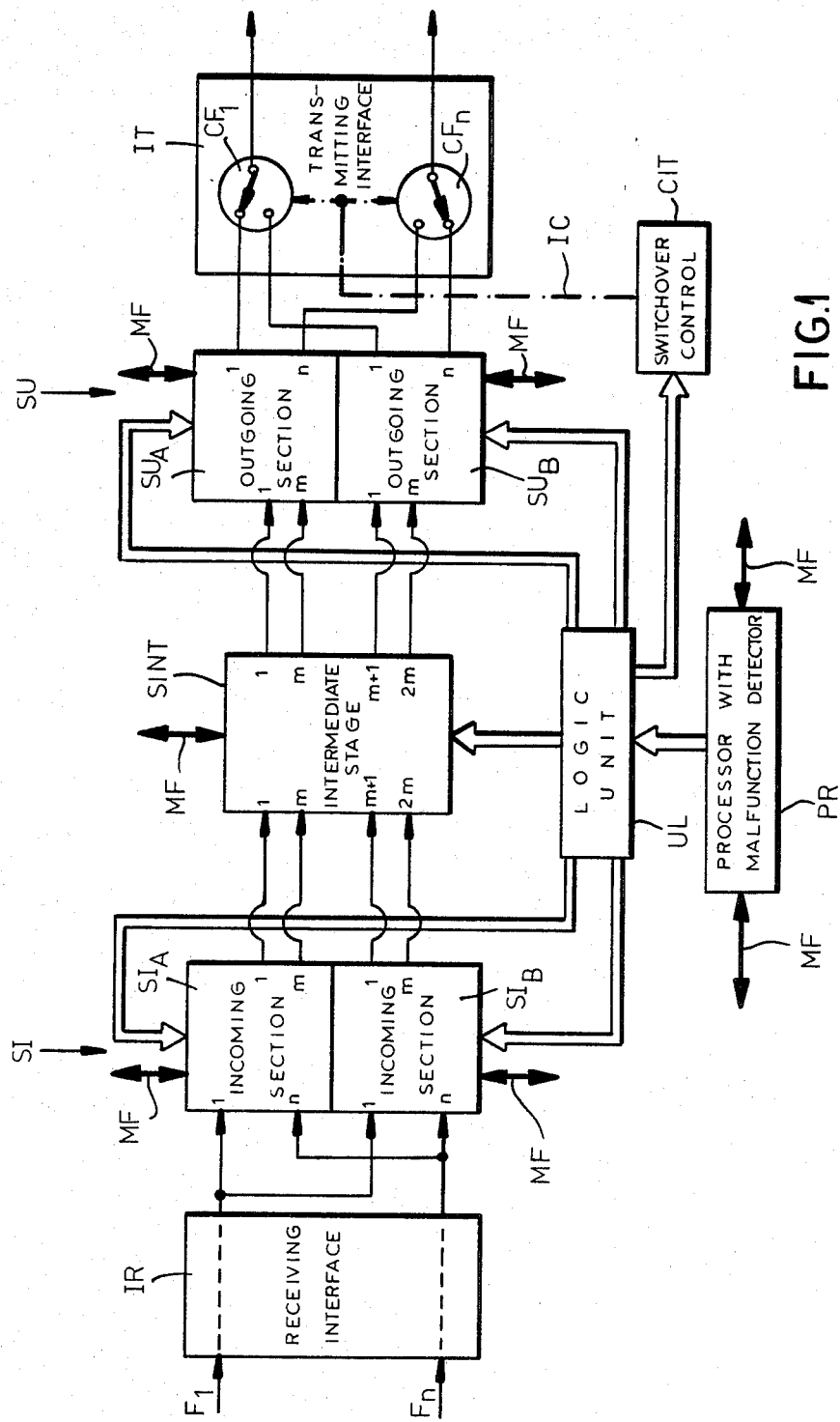
FIG. 1 is a block diagram of a network embodying our invention.

In FIG. 1 we have shown a multiplicity of incoming PCM links $F_I-F_n$ whose channels are to communicate selectively with respective channels of outgoing links $F'_I-F'_n$. Via a receiving interface IR, which detects the beginning of each frame and thus identifies the time slots assigned to all incoming channels thereof, as is well known in the art, each of these links is connected to two homologous input terminals of respective sections $SI_A$ and $SI_B$ of an incoming stage SI of a switching network according to our invention. Thus, sections $SI_A$ and $SI_B$ each have n input terminals connected to respective links $F_1-F_n$. Each of these sections further has m output terminals (with $n/2 \leq m \leq n$) connected to as many input terminals of an ntermediate stage SINT which thus has 2m input terminals selectively connectable —preferably by temporal switching—to 2m output terminals which in turn are tied to m input terminals of each of two sections $SU_A$, $SU_B$ of outgoing stage SU, each pair of homologous terminals of these two sections being connected to inputs of a respective switchover device or channel former $CF_1-CF_n$ working into links $F'_1-F'_n$.

Switchover devices $CF_1-CF_n$, which form part of a transmitting interface IT, are independently settable via a bus IC by a control unit CIT.

Stages SI, SINT and SU as well as unit CIT are controlled by a logic unit UL in response to instructions from a centralized processor PR which includes a malfunction detector of conventional type as discussed above. Connections MF between this malfunction detector and the several network stages carry error signals in the event of a failure of any switching unit in one of these stages, causing the processor to modify established connections carrying traffic (e.g. telephone signals) from receiving interface IR to transmitting interface IT. In normal operation, i.e. in the absence of malfunctions, logic unit UL may route about half the traffic from interface IR via each of the incoming sections $SI_A$, $SI_B$ and each of the outgoing sections $SU_A$, $SU_B$. Switchover devices $CF_1-CF_n$, of course, are set in a time slot assigned to any outgoing channel to connect the corresponding link ($F'_1-F'_n$) to the proper output terminal of section $SU_A$ or $SU_B$ then carrying a byte from the incoming channel communicating therewith.

Figure 2:
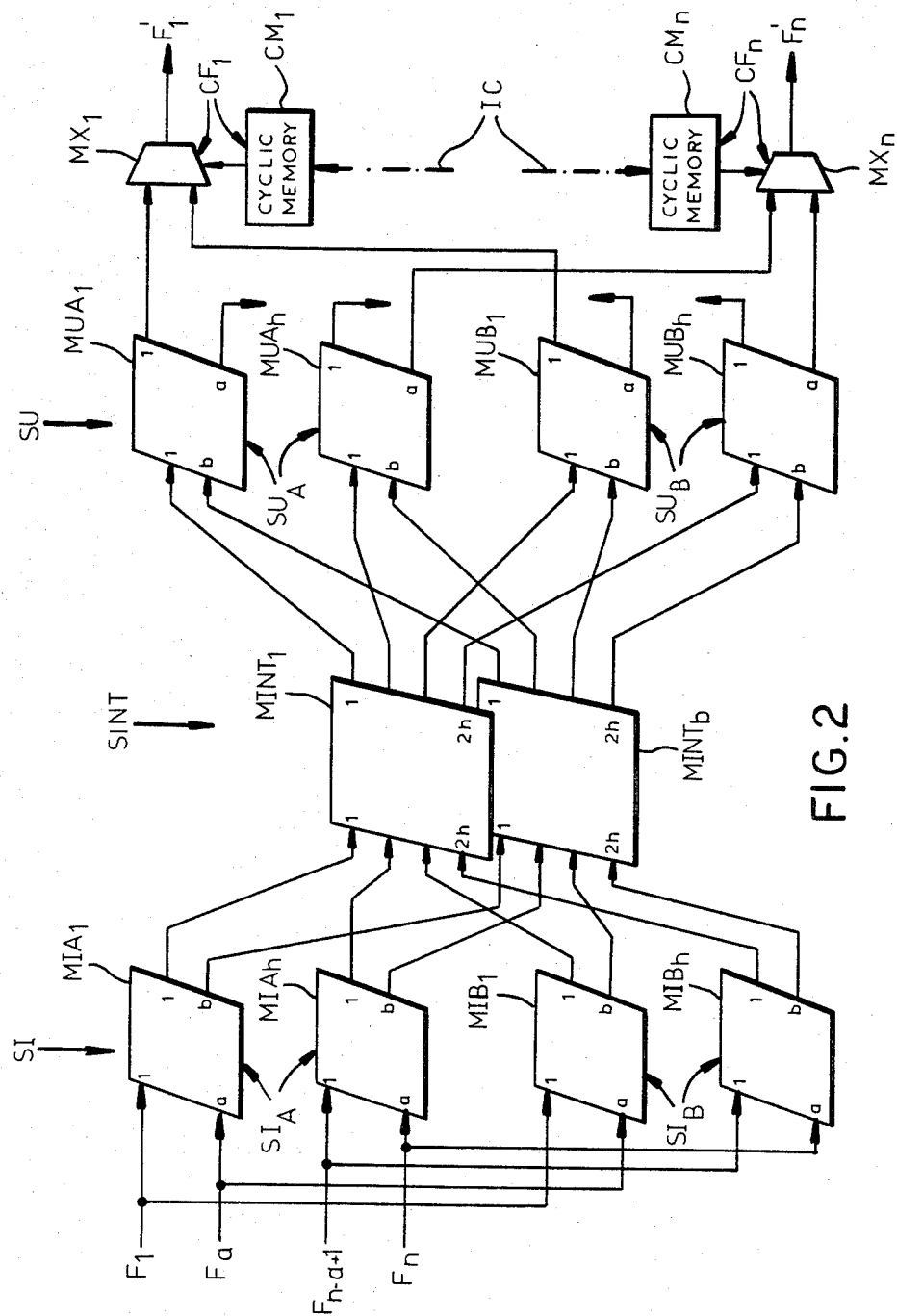
FIG. 2 shows details of the several switching stages of the network of FIG. 1.

As seen in FIG. 2, each network stage or section thereof consists of a multiplicity of matrices of which, however, only two have been illustrated in each instance. Incoming sections $SI_A$ and $SI_B$ each comprise h matrices $MIA_1-MIA_h$ and $MIB_1-MIB_h$. Similarly, outgoing sections $SU_A$, $SU_B$ each comprise h matrices $MUA_1-MUA_h$ and $MUB_1-MUB_h$. Intermediate stage SINT is formed by b matrices $MINT_1-MINT_b$. Each matrix of stage SI has a inputs and b outputs, with $a \cdot h = n$ and $b \cdot h = m$. Conversely, each matrix of stage SU has b inputs and a outputs. Each matrix of stage SINT has 2h inputs and 2h outputs. If necessary, any of these matrices—and especially those of the intermediate stage—may be subdivided into several cascaded switching arrays. With n=2048, for example, we may select a=8, h=256 or a=16, h=128; the number b may then range from 4 through 8 in the first and from 8 through 16 in the second instance, its value being preselected in accordance with the expected traffic conditions, with due regard to the maximum load the network can carry in the event of an anticipated incidence of malfunctions.

With suitable subdivision of matrices $MINT_1-MINT_b$, the entire network may be made up of elemental matrices having a maximum of 8 or 16 input and output terminals, for example; with a=b (and thus n=m), these matrices would all be identical. A matrix designed for temporal switching may have the structure shown in FIGS. 4 and 5 of prior Pat. No. 4,081,611, with a series/parallel converter, a parallel/series converter and an intervening buffer register which is written under the control of a phase counter and read under the control of a circulating memory. Each elemental matrix may be associated with an individual test circuit reporting error signals to the malfunction detector of processor PR.

As further shown in FIG. 2, switchover devices $CF_1-CF_n$ comprise respective multiplexers $MX_1-MX_n$ settable by signals read out from respective cyclic (or circulating) memories $CM_1-CM_n$ according to information stored therein by way of bus IC. It will be understood that these memories as well as the several matrices are synchronously stepped by a nonillustrated time base.

Let us assume, for instance, that a channel of incoming link $F_1$ communicates with a channel of outgoing link $F'_n$ whereas a channel of incoming link $F_n$ communicates with a channel of outgoing link $F'_1$. The first connection extends through matrices $MIA_1$, $MINT_1$ and $MUB_h$; the second one utilizes matrices $MIB_h$, $MINT_b$ and $MUA_1$. If, now, matrix $MIA_1$ malfunctions, logic unit UL will replace it with matrix $MIB_1$ which can still reach matrix $MUB_h$ via matrix $MINT_1$ without interfering with the connections established between links $F_n$ and $F'_1$. Similarly, a malfunction of matrix $MUB_h$ can be overcome by substituting matrix $MUA_h$ thereofor.

Should matrix $MINT_1$ fail, logic unit UL could replace it with matrix $MINT_b$ which provides an alternative signal path between matrices $MIA_1$ and $MIB_h$. This still will not interfere with the communication between the channels of links $F_n$ and $F'_1$ by way of the same intermediate matrix. In general, the dropout of any of the b matrices of stage SINT will require a redistribution of its signal paths among the remaining (b−1) matrices thereof. Thus, the value of b determines the extent to which the malfunction of an intermediate matrix may impair the efficiency of the network.

We claim:

1. A switching network for selectively interconnecting channels from an incoming PCM links to channels of n outgoing PCM links, comprising:
   a receiving-side stage formed by a pair of mutually identical first sections each having a multiplicity of switching units with a total of n first input terminals and m first output terminals, m being not more than n nor less than n/2, each incoming PCM link being connected in parallel to a respective pair of homologous input terminals of said first sections;
   a transmitting-side stage formed by a pair of mutually identical second sections each having a multiplicity of switching units with a total of m second input terminals and n second output terminals;
   a single intermediate stage having a multiplicity of switching units with a total of 2m third input terminals connected to respective first output terminals and 2m third output terminals connected to respective second input terminals, the switching units of said intermediate stage establishing a plurality of alternative signal paths between any switching unit of said receiving-side stage and any switching unit of said transmitting-side stage;
   switchover means for connecting each outgoing PCM link to either one of a respective pair of homologous output terminals of said second sections; and
   logic means responsive to instructions from a processor for controlling said stages to route, by way of switching units of said intermediate stage, traffic from some incoming links exclusively through switching units of one of said first sections and switching units of one of said second sections and traffic from other incoming links exclusively through switching units of the other of said first sections and switching units of the other of said second sections, with setting of said switchover means to extend the signals paths from said second sections to selected outgoing PCM links, said logic means being responsive to commands from said processor upon detection of a malfunctioning switching unit to reroute traffic from the malfunctioning switching unit to an available switching unit of the same stage for passage over an alternative path.

2. A switching network as defined in claim 1 wherein said switching units are a group of h matrices with n/h first input terminals and m/h first output terminals each in each of said first sections, a group of h matrices with m/h second input terminals and n/h second output terminals in each of said second sections, and a group of m/h matrices in said intermediate stage having each $2h$ third input terminals and $2h$ third output terminals.

3. A switching network as defined in claim 2 wherein each of said matrices is of the time-switching type.

4. A switching network as defined in claim 1 wherein said switchover means comprises a set of multiplexers controlled by said logic means.

* * * * *